R. H. HOUGH & L. J. STERN.
LENS.
APPLICATION FILED MAY 20, 1914.
1,125,327.
Patented Jan. 19, 1915.
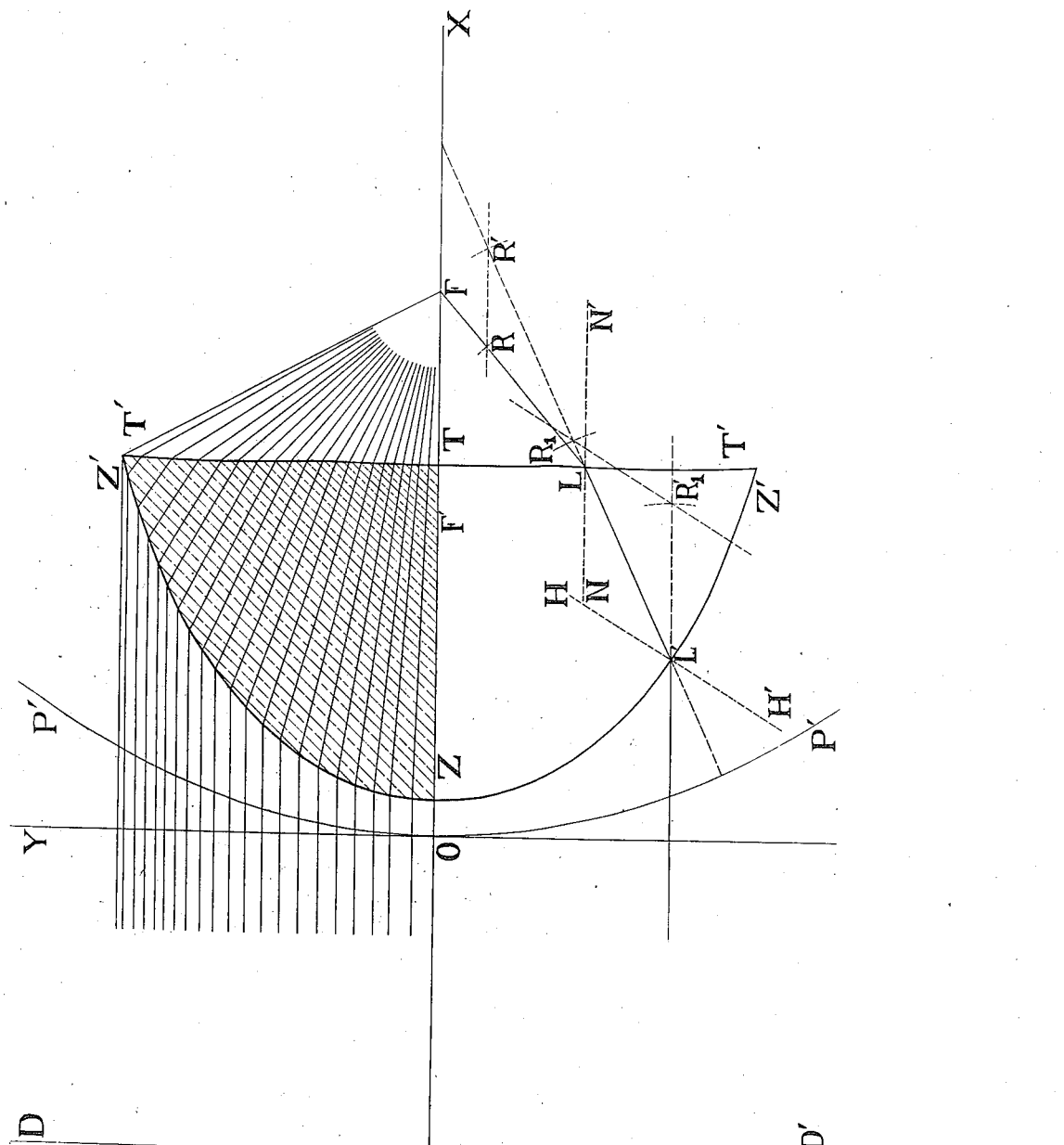
WITNESSES:
William A Stern
William E. Mitchell
INVENTORS:
Robert H. Hough.
Lewis J. Stern.

UNITED STATES PATENT OFFICE.

ROBERT H. HOUGH AND LEWIS J. STERN, OF PHILADELPHIA, PENNSYLVANIA.

LENS.

1,125,327.  Specification of Letters Patent.  Patented Jan. 19, 1915.

Application filed May 20, 1914. Serial No. 839,834.

*To all whom it may concern:*

Be it known that we, ROBERT H. HOUGH and LEWIS J. STERN, citizens of the United States, residing in the city and county of Philadelphia, Pennsylvania, have invented new and useful Improvements in Lenses, of which the following is a description.

The object of this invention is a lens so constructed as to transmit a convergent or divergent beam, and take in a very large solid angle of light from a point source.

For any given value of the index of refraction the solid angle taken in by a lens constructed with spherical surfaces is limited by a definite relation of the radii of curvature to the principal focal distance. The practical limit of the angle having its vertex at the principal focus and subtended by the diameter of the lens in condenser lenses as now manufactured is 2 $\tan^{-1}$ .5 and in our lens is more than 2 $\tan^{-1}$ 2. This means that in lenses of the same diameter, equal sources of light being placed at the principal foci, more than four times the light will be projected in a parallel beam by our lens than by the spherical lens. This quantity of light may be practically doubled by placing a spherical mirror back of the source with its center of curvature at the principal focus of our lens.

The surfaces of our lens are not spherical. They are however, surfaces of revolution, the generating curves of which are definitely defined in terms of an auxiliary curve used as a directrix. The characteristic of this auxiliary curve is a constantly decreasing curvature. The parabola may be taken as a type of these curves and is used in the following description.

References are made to the diagram accompanying and forming part of this specification.

The cross-hatched portion of the diagram shows a section of our lens taken through the axis of revolution. The other portion shows the construction of the generating curves.

P'OP' is a parabola having its focus at F' and its directrix DD'. The curve TT' is constructed with the normals to the parabola and the radii vectors from F so that its normals make angles with the radii vectors and the normals to the parabola having the index of refraction as the ratio of their sines. Therefore light diverging from F incident upon the surface of revolution TT' is refracted along the normals to the auxiliary parabola P'OP'. The curve ZZ' is constructed with the normals to the parabola and the normals to the directrix of the parabola so that its normals make angles with the normals to the parabola and the normals to the directrix of the parabola having the reciprocal of the index of refraction at the ratio of their sines. Therefore light along the normals to the auxiliary parabola P'OP' incident upon the surface of revolution ZZ' will be refracted along the normals to the directrix of the auxiliary parabola P'OP'; or light diverging from F along the radii vectors strikes the surface TT' is refracted along the normals to the auxiliary parabola P'OP' and emerges as a parallel beam. The practical construction of these curves is as follows: Commencing at any point L draw L'R', a normal to the auxiliary parabola P'OP' and lay off LR'. Construct LF and lay off LR such that the ratio of LR' to LR is the index of refraction. Construct NN' through L parallel to RR'. The perpendicular to NN' at L gives the direction of the surface at L, such that light from F to L is refracted along R'L'. At a short distance from L along the perpendicular to NN' repeat the construction, and so on; in this way the curve TT' was constructed point by point. At any point L' on the normal L'R' to the auxiliary parabola P'OP' lay off L'R$_1$. Through L' draw a normal to the directrix of the auxiliary parabola P'OP', and lay off L'R', such that the ratio of L'R'$_1$ to L'R$_1$ is the reciprocal of the index of refraction. Draw HH' through L' parallel to R$_1$R'. The perpendicular to HH' at L' gives the direction of the surface at L', such that light along R'L' is refracted along R'L'. At a short distance from L' along the perpendicular to HH' repeat the construction, and so on; in this way the curve ZZ' was constructed point by point. While it is difficult to grind a lens having these surfaces, the construction of a pressed lens of this design is reduced to the question of the construction of the mold.

It is not our purpose to restrict ourselves to the use of the parabola as a directrix, because as stated above other curves are suited to the purpose.

What we claim as new and desire to secure by Letters Patent of the United States is:

A lens having surfaces of revolution, the generating curves of which are defined in terms of the index of refraction and the normals to an auxiliary curve of decreasing curvature taken as a directrix such that the light diverging from the principal focus is refracted along the normals to the auxiliary curve and emerges from the lens in a parallel beam, substantially as set forth in the above specification.

ROBERT H. HOUGH.
LEWIS J. STERN.

Witnesses:
DAVID T. NEVIN,
S. KRIDER KENT.